(12) United States Patent
Uhrenholt (10) Patent No.: US 10,773,644 B2
(45) Date of Patent: Sep. 15, 2020

(54) WARNING SYSTEM FOR A TURNING VEHICLE AND A VEHICLE COMPRISING SUCH A WARNING SYSTEM

(71) Applicant: Fairwood Innovation A/S, Middelfart (DK)

(72) Inventor: Uffe Uhrenholt, Aarup (DK)

(73) Assignee: Fairwood Innovation A/S, Middelfart (DE)

( * ) Notice: Subject to any disclaimer, the term of this patent is extended or adjusted under 35 U.S.C. 154(b) by 0 days.

(21) Appl. No.: 15/029,199

(22) PCT Filed: Oct. 24, 2014

(86) PCT No.: PCT/DK2014/050349
§ 371 (c)(1),
(2) Date: Apr. 13, 2016

(87) PCT Pub. No.: WO2015/058776
PCT Pub. Date: Apr. 30, 2015

(65) Prior Publication Data
US 2016/0221496 A1    Aug. 4, 2016

(30) Foreign Application Priority Data

Oct. 25, 2013  (DK) .................. 2013 70622
Apr. 4, 2014   (DK) .................. 2014 70173

(51) Int. Cl.
*B60Q 1/52* (2006.01)
*B60Q 5/00* (2006.01)

(52) U.S. Cl.
CPC ............. *B60Q 1/525* (2013.01); *B60Q 5/006* (2013.01); *B60Q 2400/50* (2013.01)

(58) Field of Classification Search
CPC ..... B60Q 1/525; B60Q 2400/50; B60Q 5/006
See application file for complete search history.

(56) References Cited

U.S. PATENT DOCUMENTS

| | | | |
|---|---|---|---|
| 5,428,512 A * | 6/1995 | Mouzas | B60Q 1/12 362/249.13 |
| 2004/0051630 A1* | 3/2004 | Van de Moosdijk | B60Q 1/32 340/425.5 |

(Continued)

FOREIGN PATENT DOCUMENTS

| | | |
|---|---|---|
| DE | 102009009473 A1 | 8/2010 |
| DE | 102012011663 A1 | 1/2013 |

(Continued)

OTHER PUBLICATIONS

International Search Report and Written Opinion for PCT/DK2014/050349, dated Mar. 27, 2015, 11 pages.

(Continued)

*Primary Examiner* — Donald J Wallace
(74) *Attorney, Agent, or Firm* — Blank Rome LLP (57) ABSTRACT

A warning system is disclosed to be mounted on or incorporated in a vehicle, such as a truck or a bus, for warning vulnerable road users, such as cyclists and pedestrians, that the vehicle is going to make a turn, said warning system comprising one or more lights arranged to be mounted on or incorporated in one side of the vehicle near the front end thereof for illuminating at least a part of the surface of an area along the side and/or the front of the vehicle and a control system arranged to switch the one or more lights on and off, respectively, in accordance with a set of predefined conditions. Furthermore, a vehicle comprising such a warning system and a method of warning vulnerable road users is disclosed.

22 Claims, 5 Drawing Sheets

(56) References Cited

U.S. PATENT DOCUMENTS

| | | |
|---|---|---|
| 2004/0114381 A1* | 6/2004 | Salmeen ................ B60Q 1/085 362/465 |
| 2005/0117364 A1 | 6/2005 | Rennick et al. |
| 2007/0053195 A1 | 3/2007 | Alberti |
| 2007/0222574 A1 | 9/2007 | Courts |
| 2008/0175012 A1 | 7/2008 | Shimaoka et al. |
| 2009/0013922 A1 | 1/2009 | Lin |
| 2011/0080276 A1* | 4/2011 | Campmans ............. B60Q 1/34 340/425.5 |
| 2011/0128141 A1 | 6/2011 | Purks et al. |
| 2012/0025964 A1 | 2/2012 | Beggs et al. |
| 2012/0191298 A1* | 7/2012 | Schwarzhaupt ......... B60Q 1/22 701/36 |
| 2013/0010484 A1* | 1/2013 | Son ....................... B60Q 1/346 362/464 |
| 2013/0169425 A1* | 7/2013 | Victor ................... B60Q 1/525 340/435 |
| 2014/0185311 A1* | 7/2014 | Sharghi .................... B60R 1/00 362/520 |
| 2014/0300464 A1* | 10/2014 | Chen ....................... B60Q 1/46 340/471 |
| 2015/0343943 A1* | 12/2015 | Thoday ................... B60Q 1/38 340/435 |

FOREIGN PATENT DOCUMENTS

| | | |
|---|---|---|
| DE | 102012015905 A1 | 9/2013 |
| DK | 9600307 U3 | 10/1996 |
| DK | 200500057 U4 | 3/2006 |
| EP | 1331135 A1 | 7/2003 |
| EP | 1916154 A1 | 4/2008 |
| EP | 2543542 A1 | 1/2013 |
| JP | 2008143505 A | 6/2008 |
| WO | WO-2009/123444 A2 | 10/2009 |

OTHER PUBLICATIONS

Danish Search Report for PA 2013 70622, dated Jun. 13, 2014, 4 pages.

* cited by examiner

WARNING SYSTEM FOR A TURNING VEHICLE AND A VEHICLE COMPRISING SUCH A WARNING SYSTEM

RELATED APPLICATIONS

This application is a national phase of PCT/DK2014/050349, filed on Oct. 24, 2014, which claims the benefit of Danish Application No. PA 2013 70622, filed on Oct. 25, 2013 and Danish Application No. PA 2014 70173, filed Apr. 4, 2014. The entire contents of those applications are incorporated herein by reference.

The present invention relates to a warning system to be mounted on a vehicle, such as a truck or a bus, for warning vulnerable road users, such as cyclists and pedestrians, that the vehicle is going to make a turn. Furthermore, the invention relates to a vehicle comprising such a warning system, and a method of warning vulnerable road users.

BACKGROUND OF THE INVENTION

The problem of vulnerable road users being caught under and severely injured or even killed by turning vehicles, especially trucks and busses, is well-known and quite a lot of ideas have been conceived and tested in order to prevent such accidents or at least significantly reduce the frequency with which they occur.

Some of the systems tested focus primarily on warning the driver of the vehicle that there is or might be one or more vulnerable road users next to the vehicle and that extra care should be taken before making a turn with the vehicle. Other systems focus on warning the vulnerable road user(s) that the vehicle is or might be about to make a turn and that care should be taken not to get in the way of the turning vehicle.

European patent application EP 1 331 135 A1 and Danish utility model publications DK 96 00307 U3 and DK 2005 00057 U4 all disclose systems of the latter-mentioned type. Basically, all of these disclosed systems relates to arranging extra warning means on the side of the vehicle for emitting visual and/or acoustic warning signals when the ordinary direction indicator of the vehicle is activated. Thus, the purpose of these systems is to direct the attention of the vulnerable road user(s) towards the vehicle next to them.

BRIEF DESCRIPTION OF THE INVENTION

It is an object of the present invention to provide an improved and more efficient warning system than existing systems known in the art.

The present invention relates in a first aspect to a warning system to be mounted on or incorporated in a vehicle, such as a truck or a bus, for warning vulnerable road users, such as cyclists and pedestrians, that the vehicle is going to make a turn, said warning system comprising one or more lights arranged to be mounted on or incorporated in one side of the vehicle near the front end thereof for illuminating at least a part of the surface of an area along the side and/or the front of the vehicle and a control system arranged to switch the one or more lights on and off, respectively, in accordance with a set of predefined conditions,
wherein the set of predefined conditions include a condition that the one or more lights of the warning system can only be switched on
when the velocity of the vehicle does not exceed a predefined threshold velocity and/or
when the vehicle is in one of a number of predefined gears, such as for instance the first gear or the second gear.

One advantage of the invention may be that it may be avoided that the warning system is unnecessarily switched on when no turn of the vehicle is intended. Decrease of the velocity and shift into one of the lower gears are all indicators that a turn might be intended.

One further advantage of the invention may be that the control system may discriminate between turning around a corner, e.g. in an intersection, where the vehicle may typically have a relatively low velocity below the predefined threshold velocity and low gear, such as first or second gear, and changing lanes at a highway, where the vehicle may typically drive at increased velocities above the predefined threshold velocity and in a high gear. In fact, activation of the warning device while driving at increased velocities and a high gear at a highway may be disturbing or even dangerous to other drivers, and may even be illegal. However, activation at corners and/or intersections, where the velocity and/or gear is lowered, is necessary to warn vulnerable road users, such as e.g. cyclists, of the impending turning of the vehicle. Here it is noted that the gear may be considered an indirect measure of the velocity, since each gear correspond to a typical driving velocity range. So by excluding activation of the lights for gear higher than e.g. second gear, activation on highways may be avoided, whereas they are still activated when turning at a corner.

The one or more predefined conditions may in preferred aspects indicate that the vehicle is about to make a right turn to cross a path where vulnerable road users may go/move.

In an embodiment of the invention, the warning system further comprises one or more lenses arranged between the one or more lights and the area to be illuminated to focus the light from the one or more lights in such a way that one or more lines or symbols are formed by the focused light on the area to be illuminated.

A warning system with such a configuration with or without the focusing lenses is advantageous in that illumination of an area, which a vulnerable road user is going to enter, is much more likely to catch the attention of the vulnerable road user than just another lighting or flashing device mounted on the side of a vehicle or on a post above or next to the road.

In an embodiment of the invention, the set of predefined conditions include a condition that the one or more lights of the warning system can only be switched on when ordinary flashing indicator lamps of the vehicle on the same side thereof are activated, indicating that a driver of the vehicle intends to make a turn in that direction.

In an embodiment of the invention, the set of predefined conditions include a condition that the one or more lights of the warning system can only be switched on when the velocity of the vehicle does not exceed a predefined threshold velocity.

In an embodiment of the invention, the set of predefined conditions include a condition that the one or more lights of the warning system can only be switched on when the vehicle is in one of a number of predefined gears, such as for instance the first gear or the second gear.

It is advantageous if the warning system is not unnecessarily switched on when no turn of the vehicle is intended. Activation of the ordinary flashing indicator lamps, decrease of the velocity and shift into one of the lower gears are all indicators that a turn might be intended.

In an embodiment of the invention, the area to be illuminated substantially corresponds to the area commonly referred to as the blind angle as seen from the perspective of a driver of the vehicle.

This blind angle is the most important area to illuminate because this is the most dangerous place to be for a vulnerable road user due to the fact that the driver of the vehicle has no possibility to know that there is a vulnerable road user within this area to be aware of.

In an embodiment of the invention, the focused light formed by the one or more lenses is arranged to form one or more lines on the area to be illuminated, which one or more lines indicate the periphery of the area commonly referred to as the blind angle as seen from the perspective of a driver of the vehicle.

One or more lines indicating, which area should not be entered, is very useful for helping the vulnerable road user to stay within a safe area.

In an embodiment of the invention, the focused light formed by the one or more lenses is arranged to form one or more pictographs on the area to be illuminated warning vulnerable road users from entering the illuminated area.

Such a pictograph can be helpful in that it can be used for warning the vulnerable road user from entering the illuminated area.

In an embodiment of the invention, the light from the one or more lights of the warning system comprises one or more dominating wave lengths causing it to have a distinct colour, such as for instance red, distinguishing it from normal white or yellow street-lighting.

In an embodiment of the invention, the light from the one or more lights of the warning system is arranged to be able to flash at one or more predefined frequencies, for instance defined by a frequency range.

In an embodiment of the invention, the frequency, with which the light of the warning system flashes, is controlled to vary depending on one or more predefined criteria, such as for instance the velocity of the vehicle.

In an embodiment of the invention, the warning system further comprises one or more lights directed in a direction so that they point towards the body and/or the head of a vulnerable road user entering the area commonly referred to as the blind angle as seen from the perspective of a driver of the vehicle.

In an embodiment of the invention, the warning system further comprises a sounding body, preferably a directional sounding body, arranged to be operated along with the one or more lights of the warning system.

The above-described embodiments describe different optional technical features of the invention, all of which contribute to an even further increase of the likelihood of catching the attention of the vulnerable road user.

In an embodiment of the invention, the warning system further comprises a light meter for measuring the luminosity of the area to be illuminated.

Measuring the luminosity of the area to be illuminated allows for adjusting the intensity of the light emitted from the warning system so that energy may be saved in dark areas by decreasing the intensity, and visibility of the illumination may be obtained even in light areas by increasing the intensity of the emitted light.

In an embodiment of the invention, the one or more lights arranged to be mounted on one side of the vehicle comprise a number of Light Emitting Diodes.

The use of Light Emitting Diodes (LED) allows for a substantial reduction of the energy consumption as compared to other types of light normally used in ordinary flashing indicator lamps and the like on vehicles. Also LEDs provides a high luminous efficacy (the ratio of luminous flux to power) with regard to visible light.

In an embodiment of the invention, the warning system further comprises a camera for monitoring if a vulnerable road user enters the area to be illuminated.

The use of a camera may increase the safety even further by warning the driver that a vulnerable road user is present and demands attention.

In advantageous aspects of the invention, said predefined conditions may be based on information retrieved from a communication system of said vehicle.

Relevant information may thus e.g. be retrieved in an advantageous way, thereby retrieving one or more parameters such as e.g. vehicle speed/velocity related data, turn light information, gear information and/or the like that may be used in relation to the predefined conditions. Vehicles normally already have such a communication system incorporated, and thus, the warning system may more easily be implemented in/at a vehicle.

The communication system may in embodiments of the invention comprise a vehicle bus system such as a system operating in accordance with a Controller Area Network or a Local Interconnect Network protocol.

Such systems may be advantageous to collect information from, in that these systems are commonly used and thus, a warning system may be more easily integrated and/or may be more cost efficient.

In aspects of the invention, said predefined conditions may comprise information from one or more sensors configured for detecting persons.

Such sensors may help to provide enhanced safety and reliability of the warning system. Additionally, this may provide that the light is turned on when persons are present/detected near the vehicle, thereby providing that the light emitted from the warning system may easier be noticed by the person(s) detected by the sensor. Also, input from such sensors may be used as a condition for activating a sounding body that the detected person and/or driver can hear.

The said one or more sensors may in aspects of the invention comprise an electric sensor such as a PIR sensor, a ultrasonic sensor and/or an optical sensor.

In advantageous aspects of the invention, the warning system may comprise a plurality of light elements configured for providing light to different surface areas, preferably simultaneously, thereby together illuminating said area along the side and/or the front of the vehicle so as to indicate the a blind angle as seen from the perspective of a driver of the vehicle.

This may e.g. provide that the warning system may more efficiently light up relevant parts of the surface area, and the system may thus cover a larger area while at the same time providing a sufficient amount of light to/near e.g. the blind angle/zone so that the light will also be seen in e.g. sunlight.

In aspects of the invention said one or more lights may be arranged to illuminate said at least a part of said surface with an effect of at least 400 W/m2, preferably at least 750 W/m2, more preferably at least 900 W/m2, most preferably at least 1000 W/m2.

In aspects, said one or more lights are adapted to illuminate said at least a part of said surface with an even higher effect, such as at least 1250 W/m2, 1500 W/m2, or even above 1750 W/m2.

According to an embodiment, said one or more lights are adapted to illuminate said at least a part of said surface with an effect corresponding to at least 50% of the effect corresponding to direct illumination, such as at 75%, 90%, 100%, or even higher, such as 125% or 150%.

In advantageous aspects of the invention, the set of predefined conditions may include a condition that the one or more lights of the warning system can only be switched on when the velocity/speed of movement of the vehicle does not exceed 50 km/h, preferably 40 km/h, such as 20 km/h, e.g. 10 km/h.

One advantage of the above embodiment may be that the one or more lights are not switched on in situations, where other predefined conditions are fulfilled, but where the switching on or activation of the one or more lights is not intended. One example of such a situation may be the signalling a change of lane on a highway by turn signal (which may be a predefined condition), where the switching on the lights of the warning system is unwanted.

According to one embodiment, it may be especially relevant that a total stand still of the vehicle also provides that the one or more lights of the warning system is switched on if further conditions are also fulfilled, e.g. related to gear, that the turn light is activated and/or the like.

The warning system may according to aspects of the invention be powered by a power source such as a battery of the vehicle.

One advantage of the above embodiment may be that no internal battery of the warning system may be needed, at least for the lights being the most power consuming part of the warning system, giving a less service requiring warning system.

However, according to an alternative embodiment, the warning system may be powered by one or more batteries dedicated to the warning system. One or more batteries may also in embodiments be used as a backup power source for the warning system, and may be recharged by the power provided by the vehicle.

The warning system may in accordance with aspects of the invention comprise at least 10 LEDs (Light Emitting Diodes), such as at least 20 LEDs, such as at least 30 LEDs, such as at least 40 LEDs, such as at least 50 LEDs.

One advantage of the above embodiment may be that a powerful illumination of the ground or surface may be performed with a relatively cost effective illumination system. The LEDs may be combined with a common lens, an array of lenses and/or a common reflector or an array of reflectors.

Also, it is understood that in embodiments, the warning system may comprise different groupings each comprising at least 10 LEDs (Light Emitting Diodes), such as at least 20 LEDs, such as at least 30 LEDs, such as at least 40 LEDs, such as at least 50 LEDs for illuminating different parts of the surface. Each of these groupings may in embodiments be combined with a common lens, an array of lenses and/or a common reflector or an array of reflectors for each grouping of LEDs.

The one or more lights of the warning system may in aspects of the invention be arranged to be mounted on or incorporated in the vehicle in a height above ground no larger than 50% of the height of the vehicle, such as no larger than 40% of the height of the vehicle, such as no larger than 30% of the height of the vehicle.

According to aspects of the invention, at least one of said one or more lights may be arranged to be mounted on or incorporated in the vehicle in a height above ground no larger than 1.5 meters, preferably 1.0 meters.

The warning system may according to aspects of the invention, be configured so that at least one of said one or more lights of the warning system are arranged to be mounted on or incorporated in the vehicle so as to be able to illuminate an area on the ground within 10 meters from the vehicle, such as within 5 meters from the vehicle, e.g. within 2½ meters from the vehicle.

One advantage of the above embodiment may be that the light is kept relatively concentrated on the ground within the vicinity of the vehicle so as to warn vulnerable road users, without spreading the light too much and blinding these vulnerable road users by shining light in a direction of the eyes of these road users.

The warning system may according to aspects of the invention be configured so that said one or more lights are adapted to illuminate said surface with an effect that is adapted to ambient lighting conditions.

One advantage of the above embodiment may be that a more power efficient solution is obtained. For example, a relatively high output of optical light from the one or more lights is used only when necessary, e.g. due to a high level of ambient light, whereas the output from the one or more lights may be lower when the ambient level of light is lower thereby e.g. saving electrical power.

For instance, in some embodiments, the warning system may adapt the optical output effect to differentiate between day and night settings, i.e. a first day setting corresponding to present daylight to be exceeded, and a second night setting corresponding to no present daylight to be exceeded. In other words, the first day setting has requires a higher output from the one or more lights to exceed a higher level of ambient light. The switching between day and night settings may in some embodiments be controlled based on at least the time, whereas in other embodiments other inputs, such as a light sensor measuring the ambient light conditions, may be used. In some embodiments the level of light from the one or more lights may be controlled continuously based on the ambient level of light.

In an aspect of the invention, it relates to a vehicle, such as a truck or a bus, comprising a warning system according to any of the above aspects/embodiments.

The invention moreover relates to a first method of warning vulnerable road users such as cyclists and pedestrians that a vehicle such as a truck, van or bus is going to make a turn, said method comprising:

mounting or incorporating a warning system on or in said vehicle, said warning system comprising one or more lights mounted on or incorporated in one side of the vehicle near the front end thereof for illuminating at least a part of the surface of an area along the side and/or the front of the vehicle and by means of said control system switching the one or more lights on and off, respectively, in accordance with a set of predefined conditions.

The above warning system of the above mentioned first method may in aspects be a warning system according to any of claims 1-28.

The invention moreover relates to a second method of retrofitting a vehicle such as a truck or bus so that vulnerable road users such as cyclists and pedestrians are warned by a warning system of the vehicle when said vehicle is going to make a turn, said method comprising:

mounting or incorporating one or more lights in one side of the vehicle near the front end thereof for illuminating at least a part of the surface of an area along the side and/or the front of the vehicle, and providing a control system to said vehicle, said control system being arranged to switch the one or more lights on and off, respectively, in accordance with a set of predefined conditions.

Generally, it is understood that the control system of the warning system in aspects may be a part of the control system of the vehicle to e.g. control turn light signals, front light and rear light of the vehicle, ventilation and/or the like. In other aspects, the control system of the warning system may be considered as separate to this system even though it may be connected to the vehicle communication system.

In aspects, of the second method, said warning system may be a warning system according to any of claims 1-26 or any of claims 32-35.

The invention relates in a further aspect to a warning system to be mounted on or incorporated in a vehicle, such as a truck or a bus, for warning vulnerable road users, such as cyclists and pedestrians, that the vehicle is going to make a turn, said warning system comprising one or more lights arranged to be mounted on or incorporated in one side of the vehicle near the front end thereof for illuminating at least a part of the surface of an area along the side and/or the front of the vehicle and a control system arranged to switch the one or more lights on and off, respectively, in accordance with a set of predefined conditions.

According to an advantageous embodiment of the invention, the above warning system is according to claim 32 and any of claims 1-26.

According to an advantageous embodiment of the invention, the set of predefined conditions include a condition that the one or more lights of the warning system can only be switched on when the velocity of the vehicle does not exceed a predefined threshold velocity.

According to an advantageous embodiment of the invention, the set of predefined conditions include a condition that the one or more lights of the warning system can only be switched on when the vehicle is in one of a number of predefined gears, such as for instance the first gear or the second gear.

THE FIGURES

In the following, a few exemplary embodiments of the invention is described in more detail with reference to the figures, of which

DETAILED DESCRIPTION OF THE INVENTION

Figure 1:
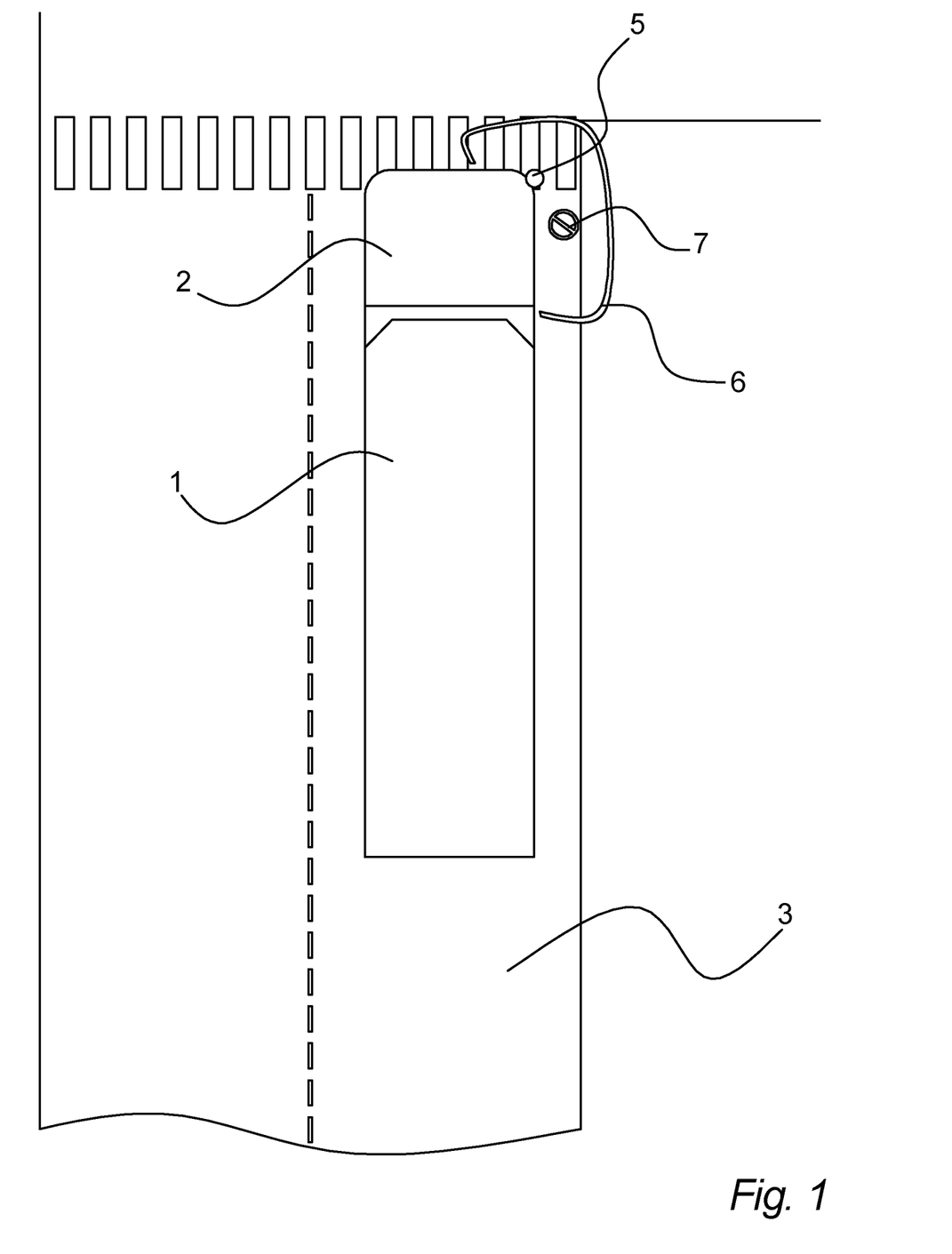
FIG. 1 illustrates schematically the function of a warning system according to an embodiment of the invention.

The arrangement and function of a warning system according to an embodiment of the invention is illustrated schematically in FIG. 1, in which a vehicle 1 is about to make a turn from a first road 3 into a second road 4.

A warning device 5 is arranged on the right front corner of the vehicle 1, since the illustration shows a vehicle 1 about to make a right turn in a country with right-hand traffic. In countries with left-hand traffic, the warning device 5 would rather be arranged on the left side of the vehicle 1. Generally spoken, the warning device 5 is to be arranged near the front of the vehicle 1 on the side opposite the driver's position 2, i.e. on the side of the vehicle 1 facing the nearest road side, bicycle path or pavement. The light emitted from the warning system of the present invention is thus to be considered as separate to the conventional blinking/(when activated by the driver) turn light of the vehicle, and the light to be transmitted from the light source of the warning system is preferably focused towards the surface area to be illuminated.

When activated, the warning device 5 emits light for illuminating at least a part of the surface area next to the vehicle 1. The illustrated embodiment of the warning device 5 further comprises means for focusing the emitted light so that a line/curve 6 and a pictograph 7 appears on the illuminated area.

The line/curve 6 indicates an area, which should not be entered by a vulnerable road user (not shown) next to the vehicle 1 in order to avoid being caught under the vehicle 1 when it turns right. In some embodiments of the invention, the line/curve 6 is arranged to follow the periphery of the area falling within the blind angle as seen from the perspective of a driver of the vehicle 1.

The pictograph 7 formed by focused light on the illuminated area functions as a warning signal to the vulnerable road user not to enter the area, which is illuminated and/or encircled by the line/curve 6 formed by focused light. For instance, the pictograph 7 can be formed to resemble a well-known "No entry" road sign.

Figure 2:
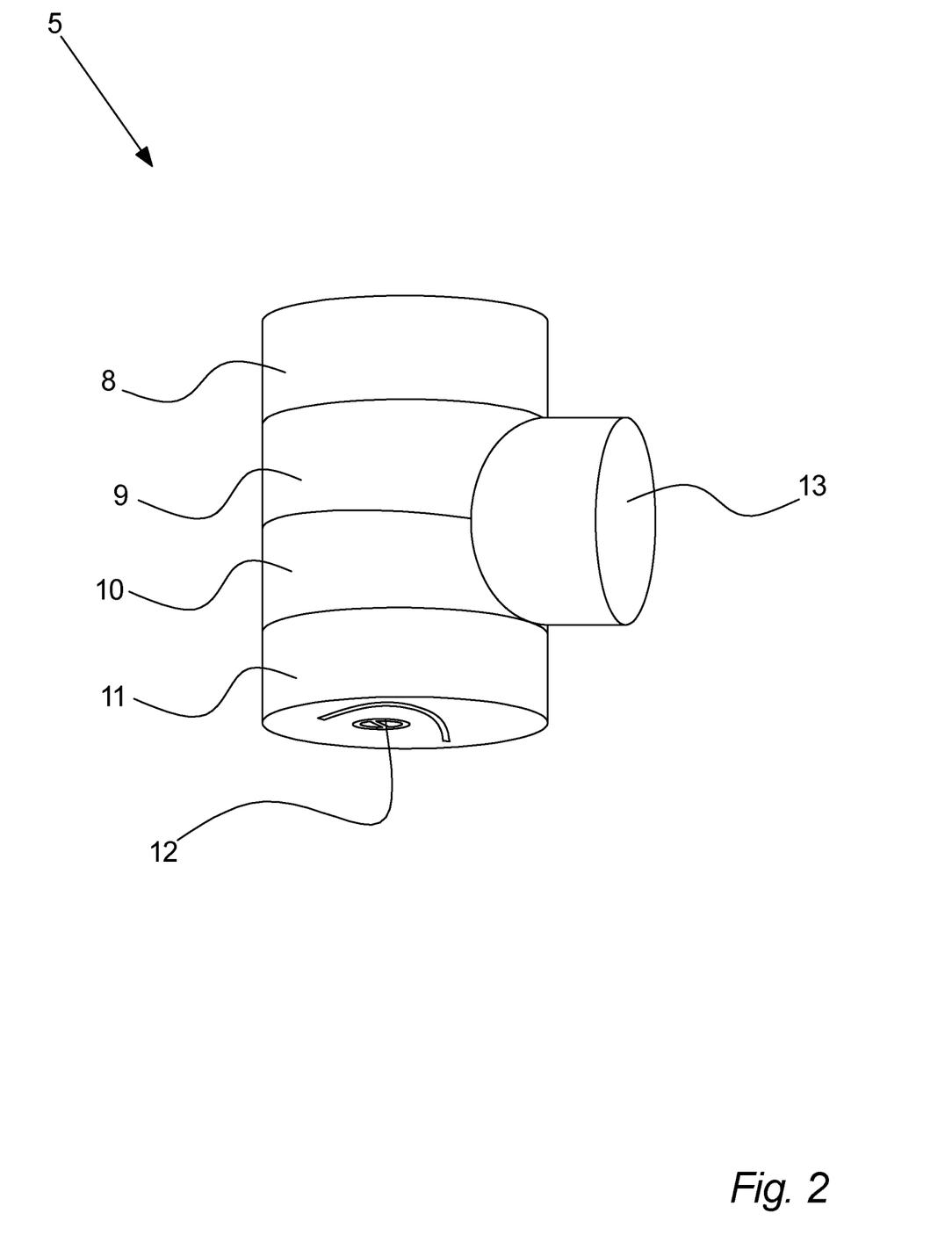
FIG. 2 illustrates schematically the composition of a warning device according to an embodiment of the invention

FIG. 2 illustrates schematically the composition of a warning device 5 according to an embodiment of the invention.

The primary parts of the warning device 5 are the light emitting element(s) 10 and the focusing lens 11.

Preferably, the light emitting element(s) consist(s) of one or more Light Emitting Diodes (LEDs), which are available in many types, sizes and colours, all of which are able to deliver a given light intensity with significantly lower energy consumption than other known electrical light emitting devices.

The focusing lens 11 comprises special features 12 so that lines/curves 6 and/or pictographs 7 like the ones shown in FIG. 1 are formed by focused light on the surface of the area being illuminated by the warning device 5.

The illustrated embodiment of the warning device 5 further comprises a number of further features, namely:

An accelerometer 9 which, by measuring the changes in the velocity of the vehicle 1, can be used by a control system (not shown) to ensure that the warning system can only be activated when the vehicle 1 moves at a speed below a certain predefined limit to avoid activation of the system, for instance, when another vehicle is overtaken at high speed on a motorway.

A light meter 8 which, by measuring the luminosity of the area to be illuminated, can be used by a control system to adjust the intensity of the light emitted from the warning system so that energy may be saved in dark areas by decreasing the intensity, and visibility of the illumination may be obtained even in light areas by increasing the intensity of the emitted light.

A preferably directional sounding body 13 arranged to be operated along with the one or more lights of the warning system to increase the likelihood of catching the attention of a vulnerable road user to be warned.

Figure 3:
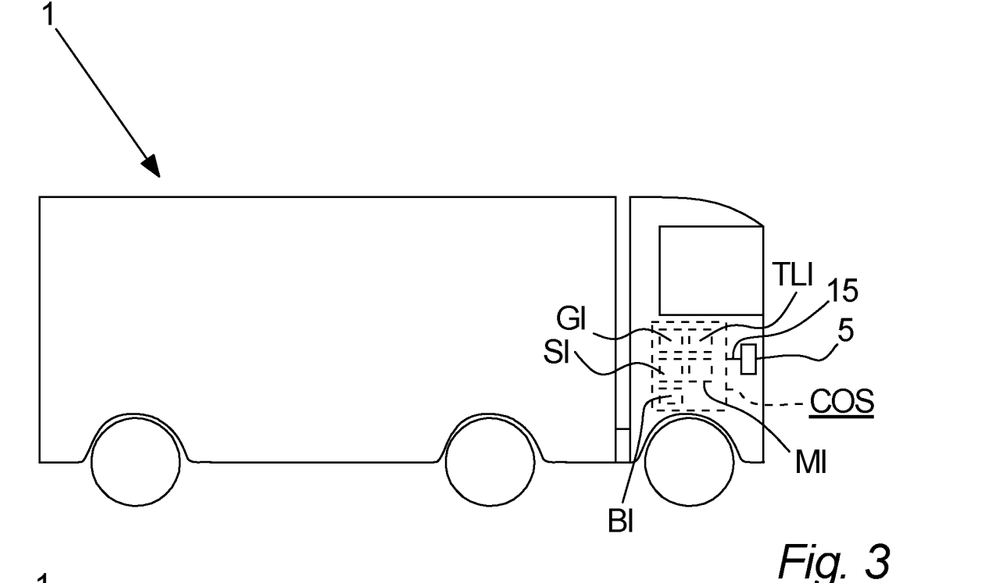
FIG. 3 illustrates an embodiment of the invention where information from a communication system of a vehicle is used.

FIG. 3 illustrates an example of a vehicle 1 comprising the warning system (in this example the warning device 5) according to embodiments of the present invention where the warning system receives/retrieves information and/or commands from a communication system COS of the vehicle and the light of the warning system are controlled based thereon.

As previously explained, a control system may be arranged to switch the one or more lights on and off, respectively, in accordance with a set of predefined conditions.

Such predefined conditions may e.g. comprise one or more of the following conditions:
that the one or more lights of the warning system can only be switched on when ordinary flashing indicator lamps of the vehicle on the same side thereof are activated, indicating that a driver of the vehicle intends to make a turn in that direction,
that that the one or more lights of the warning system can only be switched on when the velocity of the vehicle does not exceed a predefined threshold velocity, and/or
that the one or more lights of the warning system can only be switched on when the vehicle is in one of a number of predefined gears, such as for instance the first gear or the second gear.
That the vehicle's motor is running
if e.g. a brake system such as a hand brake is activated etc.

One or more of the above conditions may e.g. be referred to as conditions reflecting the operational status of the vehicle. These may be relevant in relation to determining if the vehicle is in an operational condition that fulfils criteria for turning on and/or off the light(s) of the warning system. Such information relating to the predefined conditions may be collected in different ways. For example, modern vehicles such as trucks and/or busses comprise a communication system COS which may provide such information. For example, vehicles such as busses, trucks and the like often comprises a communication system COS that interconnects components in the vehicle, this may also be referred to as a vehicle bus. Such may operate according to protocols such as Controller Area Network (CAN), Local Interconnect Network (LIN) and others.

The communication system COS may in embodiments of the invention thus be a part of an On-board diagnostics (OBD) means and relevant predefined conditions may thus in embodiments of the invention be based on OBD data. Such OBD means may refer to a the vehicle's self-diagnostic and reporting capability and may comprise relevant data that may be used for predefined conditions, e.g. vehicle speed, gear information, turn light status, motor status, motor revolution and/or the like.

A Controller Area Network may be considered as a message-based protocol, and may be considered as a vehicle bus standard designed to allow e.g. microcontrollers and/or other devices to communicate with each other in a vehicle, e.g. without a host computer.

The Local Interconnect Network may be considered as a serial network protocol used for communication between components in vehicles. This may comprise a master and slaves where preferably all messages are initiated by the master with one or more slaves replying to a given message identifier. The master may however also act as a slave by replying to its own messages. The master is typically a microcontroller, whereas the slaves are implemented as ASICs. The LIN network may in embodiments be combined with sensors to e.g. create small networks. These subsystems may e.g. be connected by a back-bone-network or the like.

The predefined conditions reflecting the operational status of the vehicle may thus in embodiments of the invention be based on information retrieved from the communication system COS of the vehicle by suitable communication means 15.

It is naturally to be understood that any suitable communication system COS of the vehicle 1 may provide relevant information relating to predefined conditions that may be used to determine whether the light of the warning system should be turned off or on. Such communications systems may continuously be updated with speed information SI relating to the speed of the vehicle, turn light status information TLI relating to if the driver has activated the turn signal, gear information GI regarding what gear the vehicle is in, motor information MI relating to if the vehicle's motor is running, brake information BI relating e.g. to if hand brakes are activated and/or other relevant conditions reflecting the operational status of the vehicle and which may be relevant in relation to operating the warning system's light.

In embodiments of the invention, the set of predefined conditions may include a condition that the one or more lights of the warning system can only be switched on when the velocity/speed of the vehicle does not exceed 50 km/h, preferably 40 km/h, such as 20 km/h, e.g. 10 km/h.

Also, in embodiments of the invention, it may be relevant that a total stand still of the vehicle also provides the one or more lights of the warning system is switched on if further conditions are also fulfilled, e.g. related to gear, that the turn light is activated and/or the like. Hence if the vehicle is in a stand still at e.g. a crossroad and has activated the turn light, the light of the warning system may also be switched on to illuminate the surface.

In embodiments of the invention, the warning system may be considered as a part of the communication system COS of the vehicle. For example, the lights and/or other parts of the warning system may be considered as a slave of the communication system in the event that the system COS comprises a master/slave configuration.

In embodiments of the invention, the warning system may be retrofitted to an existing vehicle and may thus be considered as an add-on to an existing vehicle. In such embodiments, the warning system may also in embodiments of the invention be arranged to retrieve/receive information from a communication system COS of the vehicle. Alternatively, it may comprise its own determination means for determining e.g. speed of the vehicle, if turn signal is switched on, if a person is present nearby (e.g. by a sensor for detecting persons) and/or the like.

Hence, in embodiments of the invention, the warning system may be retrofitted to an existing vehicle by e.g. attaching the warning device 5 to the vehicle, and e.g. connect the device 5 to the communication system of the vehicle, so that it retrieves the relevant information/predefined conditions, and may act based thereon.

In an embodiment of the invention, the warning system may be provided to the vehicle during manufacturing of the vehicle, and may thereby so to say be incorporated as a part of the vehicle and e.g. be provided with information from a communication system COS or even be considered as part of the communication system of the vehicle 1. and e.g. based on information from a CAN system, LIN system and/or the like.

It is thus understood that the control system arranged to switch the one or more lights on and off in embodiments of the invention may be a part of the communication system COS of the vehicle, and that it may be provided by data processor(s), data storage(s) and software of the vehicle communication system COS.

Also, it is understood that in embodiments of the invention, the control system arranged to switch the one or more lights on and off may be considered as separate to the communication system COS of the vehicle. The warning system may thus receive input parameters related to the predefined conditions from the vehicle's communication system COS, process this information by a data processor and a suitable software code, and then control the one or more lights based thereon.

It is naturally understood that the accelerometer 9 disclosed in relation to FIG. 2 in embodiments may be omitted and that relevant information thus instead may be provided by a communication system COS to e.g. ensure that the warning system may only be activated when the vehicle 1 moves at a speed below a certain predefined limit to avoid activation of the warning system, for instance, when another vehicle is overtaken at high speed on a motorway.

Figure 4:
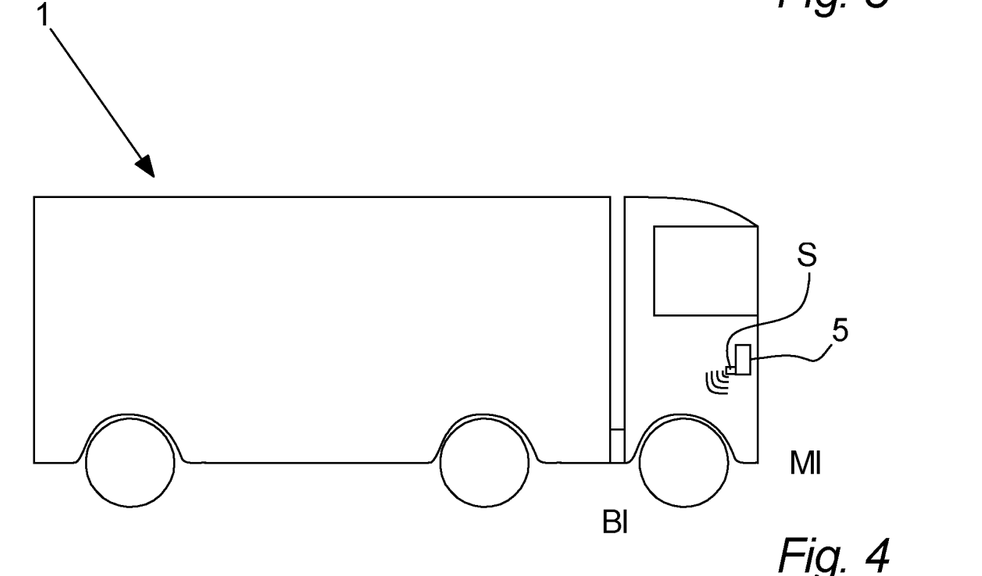
FIG. 4 illustrates an embodiment of the invention where a sensor is used for detecting persons.

Other relevant predefined conditions may in embodiments of the invention relate to sensor input from one or more sensors S as illustrated in FIG. 4. The sensor(s) S is/are configured for detecting persons that are in or near a surface area near e.g. the front end of the vehicle which is to be illuminated.

The sensor(s) is/are preferably configured to be arranged to detect persons in or near the area commonly referred to as the blind angle as seen from the perspective of a driver of the vehicle so that the warning system can be turned on before or when the person is in this "blind angle area/zone".

The one or more sensors may e.g. comprise an optic sensor, a camera combined with suitable software to detect persons, two-wheeled vehicles such as bicycles and scooters and/or the like, it may comprise a PIR (Passive Infrared Sensor), an ultrasonic sensor and/or the like.

The camera may also in embodiments be used for detecting if e.g. a line of light provided to the surface by the warning system is broken/disturbed, hence indicating that a person enters/is about to enter the blind angle area/zone.

The output from the sensor S may thus provide a condition for determining whether to turn on the light of the warning system or not. For example, if a person is detected, this may turn on the light. The sensor input may be combined with information from the communication system of the vehicle so that a person should be detected and e.g. the speed of the vehicle should be below a certain predefined speed, the vehicle should be in a predefined gear, the turn signal should be on and/or the like before turning on the light.

The sensor(s) S may in embodiments of the invention be provided to a sounding body of the warning system, e.g. inside the vehicle, a ligh arrangement inside the vehicle, e.g. at or near the dashboard of the vehicle, and/or the like, for warning the driver of the vehicle that a person is detected in or near the blind angle zone.

Figure 5:
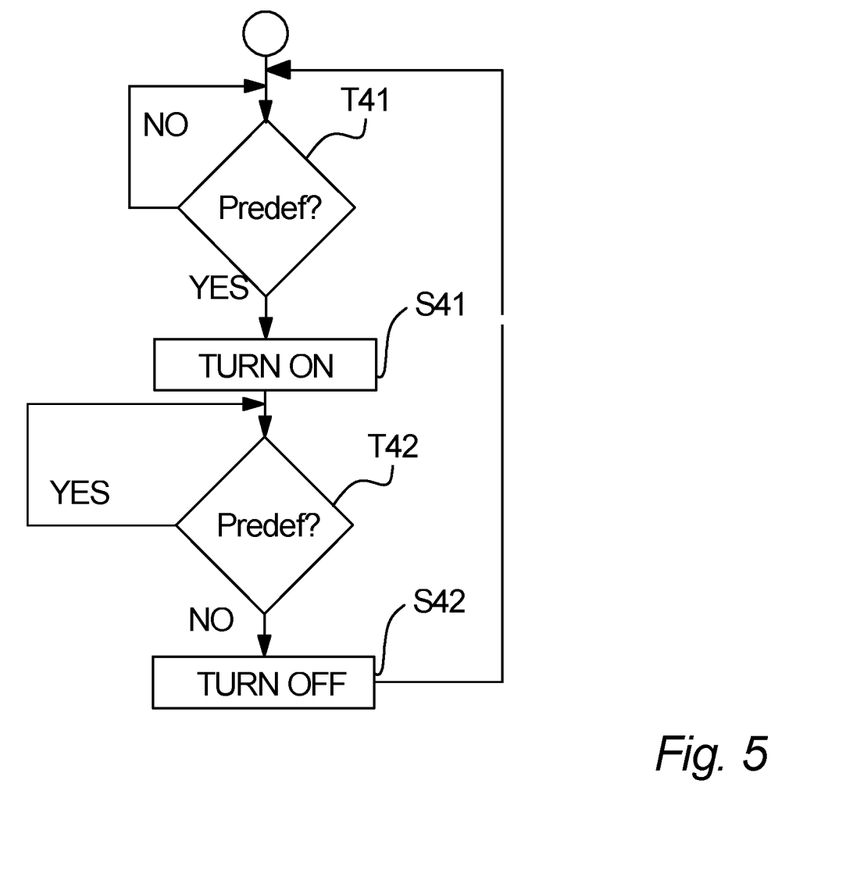
FIG. 5 illustrates a flow chart according to embodiments of the invention.

FIG. 5 illustrates an embodiment of the operation of the warning system according to embodiments of the invention.

In test T41, it is tested whether the predefined conditions are complied with. This may relate to e.g. if the turn signal of the vehicle relating to the side of the vehicle comprising the light(s) of the warning system is activated or not, it may relate to the speed of the vehicle, the gear that the vehicle is in, sensor input relating to detecting persons and/or the like.

If for example the turn signal is activated at the vehicle and the vehicle is moreover in the first, second or third gear (or any suitable number of gears dependent on the vehicle), and/or the speed of the vehicle is moreover below a predefined level (such as e.g. below 40 km/h, e.g. below 20 km/h), the conditions may be met, and the light of the system is turned on (step S41). Such information my e.g. be retrieved from a communication system COS of the vehicle (see above).

When one or more of the conditions are not more fulfilled (test T42), the lights are turned off again, (step S42). For example, when the turn signal is switched off again (automatically or by the driver) and/or the speed of the vehicle increases above a predefined level, e.g. 20 km/h, such as e.g. 40 km/h, the light of the warning system may be turned off again.

The warning system may in embodiments be turned on when the vehicle motor is turned on, a vehicle key is turned and/or the like.

In embodiments of the invention, the warning system may be supplied with electric power from the vehicles electric system such as a battery of the vehicle. It may however also in other embodiments be supplied with electric power from its own power source, e.g. a battery external to the battery of the vehicle.

Figures 6, 7, 8:
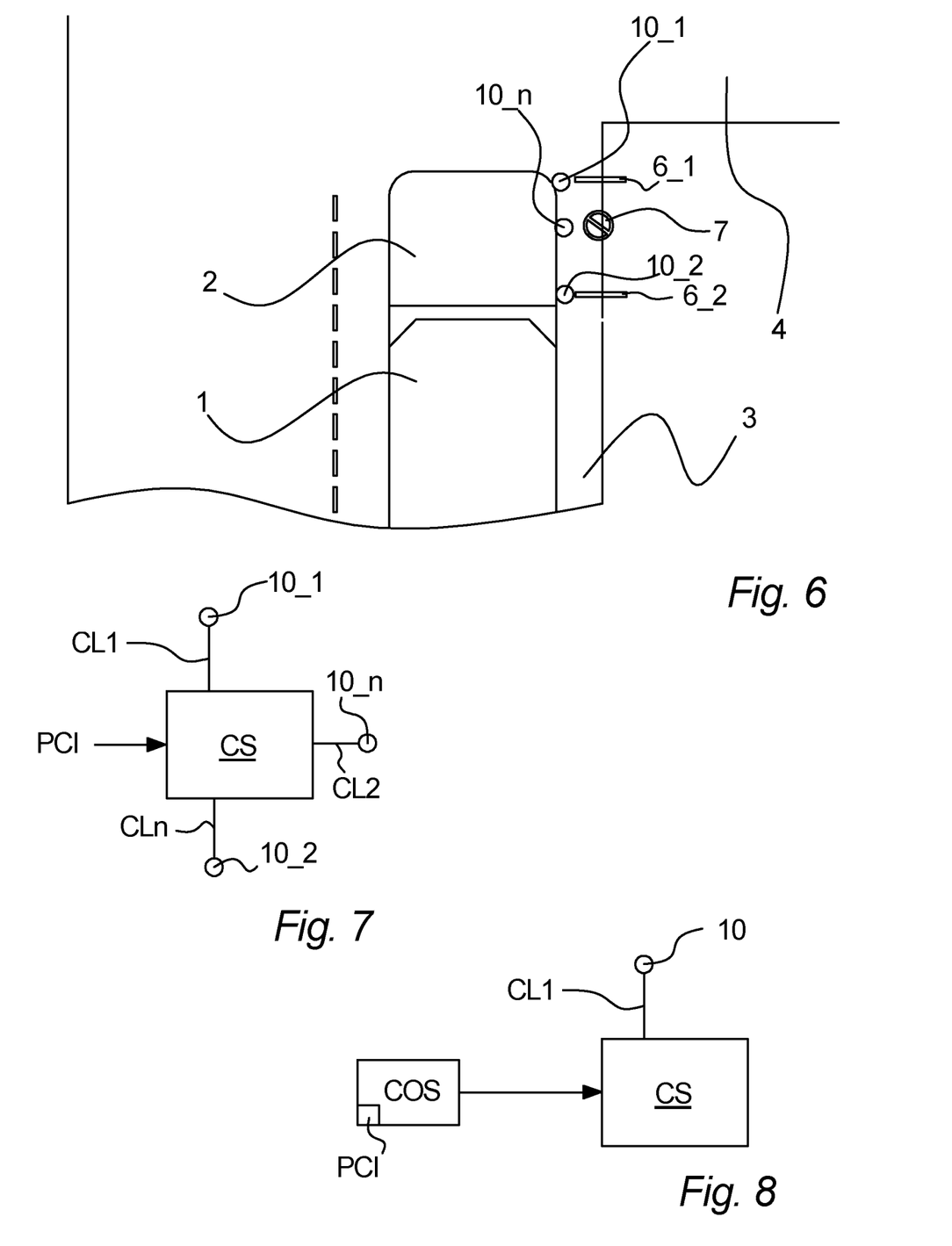
FIG. 6 illustrates an embodiment of the invention relating to using a plurality of light emitting elements for illuminating different surface areas.
FIGS. 7-8 illustrates embodiments of the invention relating to a control system of the warning system.

FIG. 6 illustrates a warning system comprising divided light sources for providing light to different areas, preferably simultaneously, dependent on the predefined conditions.

In this example, the warning system comprises a plurality of light sources configured for lighting up different parts of the area which together provides information of the blind angle of the vehicle 1. A first light emitting element 10_1 of e.g. a first device provides a first indication 6_1 on the area such as a road, bicycle track, sidewalk, or the like.

This first indication 6_1, in the present example is a line but it may also be any other suitable indication, indicates a first front border for the blind angle of the vehicle.

However, one or more straight and/or curved lines for indicating the blind angle zones may be especially advantageous.

A second light emitting element 10_2 of e.g. a second device provides a second indication 6_2 on the area such as a road, bicycle track, sidewalk, or the like. This second indication 6_2 is placed behind the first indication 6_1 at a location behind the front of the vehicle). This indication provides a second indication for indicating the rearmost part of the blind angle of the vehicle.

Generally the indication(s) on the surface provided by the light of the warning system may in advantageous embodiments comprise one or more straight and/or curved lines for indicating the blind angle zones.

A third light emitting element 10_n may then provide a further indication such as e.g. a pictograph 7 and/or the like.

The light emitting elements may thus at least comprise a light source (e.g. comprising one or more LEDs or the like) and in embodiments also one or more lenses for focusing the light.

Generally, it is to be understood that the indication(s) 6, 6_1, 6_2 in embodiments of the invention may be arranged to indicate a blind angle that may be larger than the actual blind angle of the vehicle. In other embodiments, the indication(s) may substantially correspond to the actual size of the blind angle/spot.

Also, the light emitting elements 10_1-10_n may be arranged at different locations along the vehicle 1 to provide the different indications 6_1, 6_2, 6_n.

In embodiments of the invention, the indication(s) 6, 6_1, 6_2, 7 may simply comprise an indication lighting up substantially the whole area of the blind spot/angle.

FIG. 7 illustrates a schematic view of a warning system according to embodiments of the invention. the warning system comprises light emitting elements 10_1-10_n to be mounted on or incorporated in a vehicle, preferably near the front end thereof for illuminating at least a part of the surface of an area along the side and/or the front of the vehicle and a control system CS arranged to switch the one or more lights on and off, respectively, in accordance with a set of predefined conditions.

The control system CS is provided with information predefined conditions information PCI that is used to determine whether to switch the one or more lights on or off, e.g. as explained above. The control system CS provides control signals to the light emitting elements by communication lines CL1-CLn based on the processing of the predefined input information.

The light emitting elements 10_1-10_n (which each may comprise one or more LEDs or other types of light emitting devices) may hence in embodiments be arranged to light up each their area related to the vehicle's blind spot/angle.

In an embodiment, the warning system may comprise one light emitting element for providing light to the area related to the vehicle's blind spot/angle. In other embodiments, the warning system may comprise a plurality of light emitting elements configured for lighting up different surface areas, and these together may provide an indication of the blind spot(s) of the vehicle, e.g. as described in relation to FIGS. 6 and 7. These light emitting elements may preferably be turned on and/or off substantially simultaneously.

Thus, it is understood that the warning system may comprise any suitable number of light emitting elements, e.g. one light emitting element, two light emitting elements, three light emitting elements or even more light emitting elements, each of which may comprising one or more light emitting devices such as an LED or the like. Each light emitting element may also comprise one or more lenses arranged between the one or more light emitting devices and the area to be illuminated to focus the light from the one or more lights in such a way that e.g. one or more lines or symbols are formed by the focused light on the surface area to be illuminated and/or the like.

The control system CS of the warning system (and in embodiments of the invention also the light sources) may in embodiments of the invention be a part of a communication system COS of the vehicle, see e.g. above in relation to FIG. 3. The predefined condition information may thus be retrieved from this communication system COS.

The control system CS may in embodiments of the invention be separate to the communication system COS of the vehicle, but may still retrieve predefined criteria information from a communication system of the vehicle as illustrated in FIG. 8. The control system CS may thus comprise software, data storage, data processor(s) and the like for controlling the light source(s) based on the predefined condition(s).

Generally, In embodiments of the invention the above mentioned light element(s) may be arranged to illuminate the surface area with an effect of at least 400 W/m2, preferably at least 750 W/m2, more preferably at least 900 W/m2, most preferably at least 1000 W/m2. In embodiments, the light(s) may be configured to illuminate said surface with an even higher effect, such as at least 1250 W/m$^2$, 1500 W/m$^2$, or even at least 1750 W/m$^2$.

According to embodiments of the invention, said one or more lights of the warning system are adapted to illuminate said at least a part of said surface with an effect corresponding to at least 50% of the effect corresponding to direct solar illumination, such as at 75%, 90%, 100%, or even higher, such as 125% or 150%. Preferably, according to an embodiment, illumination effects (energy per time) may be measured as the effect of visible light measured at ground level. According to an embodiment the effect of direct solar illumination may be taken as 1000 W/m2.

The warning system may generally, in embodiments, comprise at least 10 LEDs (Light Emitting Diodes), such as at least 20 LEDs, such as at least 30 LEDs, such as at least 40 LEDs, such as at least 50 LEDs. The LEDs may in embodiments be combined with a common lens, an array of lenses and/or a common reflector or an array of reflectors.

Also, it is understood that in embodiments, the warning system may comprise different groupings each comprising at least 10 LEDs (Light Emitting Diodes), such as at least 20 LEDs, such as at least 30 LEDs, such as at least 40 LEDs, such as at least 50 LEDs for illuminating different parts of the surface. Each of these groupings may in embodiments be combined with a common lens, an array of lenses and/or a common reflector or an array of reflectors for each grouping of LEDs.

In advantageous embodiments of the invention, the one or more lights of the warning system may be arranged to be mounted on or incorporated in the vehicle in a height above ground no larger than 50% of the height of the vehicle, such as no larger than 40% of the height of the vehicle, such as no larger than 30% of the height of the vehicle.

According to embodiments of the invention, at least one of said one or more lights may be mounted on or incorporated in the vehicle in a height above ground no larger than 1.5 meters, preferably no larger than 1.0 meters.

The warning system as described above may in embodiments be mounted on or incorporated in the vehicle so as to be able to illuminate an area on the ground within 10 meters from the vehicle, such as within 5 meters from the vehicle, e.g. within 2½ meters from the vehicle.

In embodiments of the invention, the warning system, the light(s) of the warning system may be adapted to illuminate said surface with an effect that is adapted to ambient lighting conditions. For instance, in some embodiments, the warning system may adapt the optical output effect to differentiate between day and night settings, i.e. a first day setting corresponding to present daylight to be exceeded, and a second night setting corresponding to no present daylight to be exceeded. In other words, the first day setting has requires a higher output from the one or more lights to exceed a higher level of ambient light. The switching between day and night settings may in some embodiments be controlled based on at least the time, whereas in other embodiments other inputs, such as a light sensor measuring the ambient light conditions, may be used. In some embodiments the level of light from the one or more lights may be controlled continuously based on the ambient level of light.

LIST OF REFERENCE NUMBERS

1. Vehicle
2. Driver's position in vehicle
3. Road from which the vehicle is about to turn
4. Road into which the vehicle is about to turn
5. Warning device
6. Line/curve formed by focused light on illuminated area
7. Pictograph formed by focused light on illuminated area 8. Light meter
9. Accelerometer
10. Light emitting element(s)
11. Focusing lens
12. Special features on focusing lens for obtaining lines and/or pictograph(s)
13. Sounding body
15. Communication means
COS. Communication system of vehicle
S. Sensor
CL. Communication line

The invention claimed is:

1. A warning system to be mounted on or incorporated in a truck for warning cyclists that the truck is going to make a turn, said warning system comprising:
   one or more lights arranged to be mounted on or incorporated in one side of the truck near the front end thereof for highlighting a part of the surface of an area immediately along the side of the truck by illumination; and
   a control system arranged to switch the one or more lights on and off, respectively, in accordance with a set of predefined conditions,
   wherein the set of predefined conditions include a condition that the one or mor s of the warning system can only be switched on
      when the velocity of the truck does not exceed a predefined threshold velocity and/or
      when the truck is in one of a number of predefined gears,
   wherein the area to be highlighted is limited to a blind spot related to cyclists, without highlighting non-blind spot areas related to cyclists, as defined from the perspective of a driver of the truck.

2. The warning system according to claim 1, further comprising one or more lenses arranged between the one or more s and the area to be highlighted to focus the light from the one or more lights in such a way that symbols are formed by the focused light on the area to be highlighted.

3. The warning system according to claim 1, wherein the set of predefined conditions include a condition that the one or more lights of the warning system can only be switched on when ordinary flashing indicator lamps of the truck on the same side thereof are activated, indicating that a driver of the truck intends to make a turn in that direction.

4. The warning system according to claim 1, further comprising one or more lenses is arranged to focus light from the one or more lights to form one or more lines on the area to be highlighted, which one or more lines indicate the periphery of the area falling within the area commonly referred to as the blind spot as seen from the perspective of a driver of the truck.

5. The warning system according to claim 1, further comprising one or more lenses is arranged to focus light from the one or more lights to form one or more pictographs on the area to be highlighted warning vulnerable road users from entering the highlighted area.

6. The warning system according to claim 1, wherein the light from the one or more lights of the warning system comprises one or more dominating wave lengths causing it to have a distinct colour, distinguishing it from normal white or yellow street-lighting.

7. The warning system according to claim 1, wherein the light from the one or more lights of the warning system is arranged to be able to flash at one or more predefined frequencies.

8. The warning system according to claim 1, further comprising one or more lights directed in a direction so that they point towards the body and/or the head of a vulnerable road user entering the area commonly referred to as the blind spot as seen from the perspective of a driver of the truck.

9. The warning system according to claim 1, wherein the one or more lights arranged to be mounted on one side of the truck comprise a number of Light Emitting Diodes.

10. The warning system according to claim 1, wherein said predefined conditions are based on information retrieved from a communication system of said truck.

11. The warning system according to claim 10, wherein said communication system comprises a truck bus system.

12. The warning system according to claim 1, wherein said predefined conditions comprises information from one or more sensors configured for detecting persons.

13. The warning system according to claim 1, wherein said warning system comprises a plurality of light elements configured for providing light to different surface areas, thereby together illuminating said highlighted area along the side and/or the front of the truck so as to indicate the blind spot as seen from the perspective of a driver of the truck.

14. A warning system according to claim 1, wherein said one or more lights are adapted to illuminate said at least a part of said surface with an effect of at least 400 W/m2.

15. The warning system according to claim 1, wherein the set of predefined conditions include a condition that the one or more lights of the warning system can only be switched on when the velocity of the truck does not exceed 50 km/h.

16. The warning system according to claim 1, wherein said one or more lights are powered by the truck.

17. The warning system according to claim 1, wherein said one or more lights are adapted to illuminate said surface with an effect that is adapted to ambient lighting conditions.

18. The warning system of claim 1, wherein the one or more lights delineate a clearly defined boundary that the cyclist should avoid.

19. A vehicle comprising a warning system for warning cyclists that the vehicle is going to make a turn, said warning system comprising:
   one or more lights arranged to be mounted on or incorporated in one side of the vehicle near the front end thereof for highlighting least a part of the surface of an area along the side and/or the front of the vehicle; and
   a control system arranged to switch the one or more lights on and off, respectively, in accordance with a set of predefined conditions,
   wherein the set of predefined conditions include a condition that the one or more lights of the warning system can only be switched on
      when the velocity of the vehicle does not exceed a predefined threshold velocity and/or
      when the vehicle is in one of a number of predefined gears,
   wherein the area to be highlighted is limited to a blind spot related to cyclists as defined from the perspective of the driver of the vehicle, without highlighting non-blind spot areas related to cyclists.

20. The vehicle of claim 19, wherein the one or more lights delineate a clearly defined boundary that the cyclist should avoid.

21. A method of warning cyclists that a vehicle is going to make a turn, said method comprising:
   mounting or incorporating a warning system on or in said vehicle, said warning system comprising one or more lights mounted on or incorporated in one side of the vehicle near the front end thereof for highlighting at least a part of the surface of an area along the side and/or the front of the vehicle; and by means of a control system switching the one or more lights on and off, respectively, in accordance with a set of predefined conditions, wherein the area to be highlighted is limited to a blind spot related to cyclists, without highlighting non-blind spot areas related to cyclists, as defined from the perspective of the driver of the vehicle.

22. The method of claim 21, wherein the one or more lights delineate a clearly defined boundary that the cyclist should avoid.

* * * * *